United States Patent
Spiegel

(10) Patent No.: US 11,353,836 B2
(45) Date of Patent: *Jun. 7, 2022

(54) METHOD FOR SECURE COMMUNICATION WITH A FIELD MEASURING DEVICE OF PROCESS MEASURING TECHNOLOGY AND CORRESPONDING FIELD MEASURING DEVICE

(71) Applicant: KROHNE Messtechnik GmbH, Duisburg (DE)

(72) Inventor: Christoph Spiegel, Oberhausen (DE)

(73) Assignee: KROHNE Messtechnik GmbH, Duisburg (DE)

( * ) Notice: Subject to any disclaimer, the term of this patent is extended or adjusted under 35 U.S.C. 154(b) by 0 days.

This patent is subject to a terminal disclaimer.

(21) Appl. No.: 15/994,679

(22) Filed: May 31, 2018

(65) Prior Publication Data

US 2018/0352436 A1 Dec. 6, 2018

(30) Foreign Application Priority Data

May 31, 2017 (DE) .......................... 102017111933.7

(51) Int. Cl.
*H04L 9/00* (2022.01)
*G05B 19/042* (2006.01)
(Continued)

(52) U.S. Cl.
CPC ........... *G05B 19/042* (2013.01); *G06F 21/44* (2013.01); *G06F 21/85* (2013.01); *H04L 63/083* (2013.01);
(Continued)

(58) Field of Classification Search
CPC .... H04W 12/06; H04W 12/08; G05B 19/042; G06F 21/44; G06F 21/85; H04L 63/0823;
(Continued)

(56) References Cited

U.S. PATENT DOCUMENTS 6,094,600 A * 7/2000 Sharpe, Jr. .......... G05B 19/4185
700/19
7,530,113 B2 5/2009 Braun
(Continued)

FOREIGN PATENT DOCUMENTS

DE 10255517 A1 6/2004
DE 102007046079 A1 4/2009
(Continued)

OTHER PUBLICATIONS

"ICS-Security-Kompendium" with translation (ICS Security Compendium), Version 1.23, Federal Office for Information Security (BSI) 2013, Internet: https://www.bsi.bund.de, 244 pages.
(Continued)

*Primary Examiner* — Josnel Jeudy
(74) *Attorney, Agent, or Firm* — Whitmyer IP Group, LLC

(57) ABSTRACT

A method for secure communication with a field measuring device of process measuring technology is described and shown. Upon contact by an external communication means with a web server via a communication interface, a first authenticity check of an external communication means is carried out by the field measuring device and a second authenticity check of the external communication means is carried out. After successful completion of the first authenticity check and the second authenticity check, further communication of the external communication means with the web server is authorized by the field measuring device.

18 Claims, 3 Drawing Sheets

(51) Int. Cl.
*G06F 21/85* (2013.01)
*G06F 21/44* (2013.01)
*H04W 12/06* (2021.01)
*H04L 9/40* (2022.01)
*H04W 12/08* (2021.01)

(52) U.S. Cl.
CPC ...... *H04L 63/0823* (2013.01); *H04L 63/0853* (2013.01); *H04L 63/0861* (2013.01); *H04W 12/068* (2021.01); *H04W 12/08* (2013.01); *G05B 2219/24162* (2013.01); *G05B 2219/24167* (2013.01); *H04L 2463/082* (2013.01)

(58) Field of Classification Search
CPC ............... H04L 63/083; H04L 63/0853; H04L 63/0861; H04L 2463/082
USPC .......................................................... 726/4
See application file for complete search history.

(56) References Cited

U.S. PATENT DOCUMENTS

| | | | |
|---|---|---|---|
| 9,235,204 B2 | 1/2016 | Fries et al. | |
| 9,684,775 B2 | 6/2017 | Gupta et al. | |
| 2002/0059518 A1* | 5/2002 | Smeets | G06F 21/44 713/166 |
| 2005/0021705 A1* | 1/2005 | Jurisch | H04L 29/06027 709/223 |
| 2005/0033886 A1 | 2/2005 | Grittke et al. | |
| 2006/0143469 A1 | 6/2006 | Schmidt et al. | |
| 2008/0294771 A1* | 11/2008 | Hermes | G05B 23/0267 709/224 |
| 2009/0276486 A1* | 11/2009 | Tandon | G05B 19/4185 709/203 |
| 2010/0313259 A1 | 12/2010 | Fries et al. | |
| 2012/0230555 A1* | 9/2012 | Miura | G06K 9/00087 382/124 |
| 2014/0188933 A1* | 7/2014 | Chomik | H04L 67/125 707/770 |
| 2015/0106826 A1* | 4/2015 | Hahniche | H04L 41/0253 719/321 |
| 2015/0121486 A1* | 4/2015 | Ye | H04W 4/80 726/5 |
| 2015/0244697 A1 | 8/2015 | Siddesh et al. | |
| 2016/0379211 A1* | 12/2016 | Hoyos | G06F 21/32 705/75 |

FOREIGN PATENT DOCUMENTS

| | | |
|---|---|---|
| DE | 102011078030 A1 | 12/2012 |
| DE | 102012108866 A1 | 3/2014 |
| EP | 1621944 A2 | 2/2006 |
| WO | 2016060738 A1 | 4/2016 |
| WO | 2018157960 A1 | 9/2018 |

OTHER PUBLICATIONS

Stouffer, Keith, et al., "Guide to Industrial Control Systems (ICS) Security", NIST Special Publication 800-82, Revision 2, National Insitute of Standards and Technology, May 2015, publication: http://dx.doi.org/10.6028/NIST. SP.800-82r2, 247 pages.
Error Message, Retrieved from "https://en. wikipedia. org/w/index. php?title=Error_message&oldid=782170274", Feb. 19, 2018, 4 pages.
Anonymous: "Zwei-Faktor-Authentisierung—Wikipedia", Mar. 20, 2017 (Mar. 20, 2017), XP055510294, Gefunden im Internet: URL:https://de.wikipedia.org/w/index.php?title=Zwei-Faktor-Authentisieru ng&oldid=163780849 [gefunden am Sep. 26, 2018] 4 Pages.
European Search Report and European Search Opinion Application No. EP 18 170 998.1 Completed: Sep. 26, 2018; dated Oct. 9, 2018 10 Pages.

* cited by examiner

METHOD FOR SECURE COMMUNICATION WITH A FIELD MEASURING DEVICE OF PROCESS MEASURING TECHNOLOGY AND CORRESPONDING FIELD MEASURING DEVICE

TECHNICAL FIELD

The invention relates to a method for secure communication with a field measuring device of process technology, wherein the field measuring device comprises a sensor, an evaluation unit, a fieldbus interface for the transmission of measurement data detected and provided by the field measuring device to other bus devices and/or to a process control system, and a communication unit with a communication interface, wherein a web server is implemented on the communication unit, and wherein the web server can be externally accessed by means of the communication interface. Furthermore, the invention relates to a field measuring device of process technology with a sensor, an evaluation unit, a field bus interface for the transmission of measurement data detected and provided by the field measuring device to other bus devices and/or to a process control system, and a communication unit, wherein the communication unit has a communication interface, wherein a web server is implemented on the communication unit, wherein the web server can be externally accessed by means of the communication interface.

BACKGROUND

Field measuring devices of process measuring technology have been used for many decades in automation technology for measurement value logging in industrial processes. The field measuring devices metrologically record process variables via their sensors, process, with the evaluation unit, the raw measurement data into a measured variable to be transmitted and transmit this measured variable usually to other bus devices or to a higher-level process control system. The measuring devices work "in the field", they are usually very robust and designed to be interference-proof and to have a high noise-immunity, since they are exposed to all adversities of the industrial process, sometimes they are used outdoors, so usually there are no "laboratory conditions".

For transmitting the measured data, the field device uses a fieldbus interface that implements an established protocol. The established fieldbus interfaces include, for example, the analog 4-20 mA interface that has been used for decades or the digital HART interface. As a physical transmission medium, in this case, a 2-wire arrangement is often used, wherein the digital signal of the HART protocol is modulated on the analog current signal of the current interface. Fieldbus interfaces of this type only implement comparatively low transmission rates, however, they have an extraordinarily high standing power in the process industry, since their reliability is proven and they are considered safe from manipulation. Fieldbus interfaces often only allow the field measuring device to be influenced to a very limited extent, since access to functionalities of the process measuring instrument that are outside the actual transmission of measurement results is intentionally not provided via the fieldbus interface.

Sensitive and, thus, protective functionalities of field measuring devices aside from measured data transmission relate, for example, to parameterization, the setting of operating modes, calibration parameters of the process measuring device and diagnosis.

Efforts have been made for some time to equip the previously described field measuring devices with a—further—communication interface, which is usually implemented with more modern communication technologies, so that higher transmission rates and modern user interfaces can be implemented. Essentially non-process-relevant data is to be exchanged via this communication interface, i.e. data which are not actually the actual measurement data.

The subject matter of the present consideration are such field measuring devices that are equipped with a communication unit on which a web server is implemented. External access takes place by means of a web browser via the communication interface designed in this manner, wherein standardized transmission protocols and network protocols are generally used. As a matter of principle, such a communication interface allows for easier, but less easily controllable, access to the field measuring device, so that special attention must be paid to protecting the communication interface against unauthorized access.

It is known from the prior art to protect the field measuring device against mass corruption attempts by storing a CAPTCHA functionality on the field measuring device in the same way as other web-based applications. Because of this functionality, when being contacted by an external communication means, it can be decided to a certain extent whether this external communication means is a human or a machine. Frequently, CAPTCHA functionality provides tasks that people can easily solve but computers can not. These tasks include, for example, recognizing pictorially displayed objects, distorted lettering or solving a simple arithmetical problem. The disadvantage of this technology is that such functionalities are difficult or impossible to implement or can only be implemented in a very simplified manner with the often limited hardware resources of a field measuring device, so that a solution of the task is also within reach by a computer. In addition, the addressed CAPTCHA functionality also does not protect against a human as unauthorized external means of communication being able to gain access to the field measuring device.

SUMMARY

The object of the present invention is to provide a method for secure communication with a field measuring device of process measuring technology and a corresponding field measuring device in which a high degree of security prevents improper access to the field measuring device by means of a communication interface, namely a communication interface different from the fieldbus interface, with a web server.

The object is initially and essentially achieved by the method described above for secure communication with a field measuring device of the process measuring technology, in that upon contact by an external communication means with the web server via the communication interface, a first authenticity check of the external communication means is carried out by the field measuring device and a second authenticity check of the external communication means is carried out. After successful completion of the first authenticity check and the second authenticity check, further communication of the external communication means with the web server is authorized by the field measuring device.

In particular, it is provided that only such data can be exchanged via the communication interface, which are not the actual measurement data.

The external communication means can be a human, but it may also be a machine automated communication means, such as a diagnostic computer, this is not of importance. The first authenticity check and the second authenticity check are therefore expressly not a CAPTCHA functionality for distinguishing between human and machine external means of communication. The first and second authenticity checks involve proving access rights of the external communication means, regardless of whether it is a human or a machine. By implementing two authenticity checks, a significantly greater degree of access security can be achieved than, for example, with just one authenticity check combined with a CAPTCHA functionality. Only after successful completion of both authenticity checks, to which the external communication means is subjected, is further communication between the field measuring device and the external communication means possible via the communication interface, which is backed with a web server.

According to an advantageous implementation of the method, it is provided that a feature of the external communication means is checked in the first authenticity check and the second authenticity check, wherein the feature belongs to one of the identification categories: the individual, immaterial identification knowledge of a human external communication means, the possession of a material or an immaterial identification means or a biometric feature of a human external communication means. The listed identification categories have in common that their characteristics can not be deduced with cognitive achievements, be it cognitive achievements of a human or of a computer. The authenticity checks can therefore only be successfully completed if set defined identification features are presented without errors. The set defined identifiers, thus, are not the results of a task achieved by simple reasoning. According to a preferred implementation, it is provided in the method that features of different identification categories are checked during the first authenticity check and the second authenticity check. The security achieved in this manner is particularly evident when concrete examples of characteristics of the various categories of identification are used.

According to one implementation of the method, the individual, immaterial identification knowledge of a human external communication means is a password, a personal identification number (PIN) or the answer to a security question. In the security question, in turn, individual factual knowledge is queried; the security question is not about providing a cognitive answer that can be provided by virtually anyone. Another implementation of the method is characterized in that the physical or immaterial identification means is a chip card, in particular in the form of a smart card or a signature card, a magnetic strip card, an RFID chip, a cryptographic key, in particular in the form of a private key or a public key of an asymmetric encryption method, a SIM card, a digital certificate, in particular an SSL certificate, a one-time PIN, in particular for SecurID, or a device-specific machine identifier, in particular the serial number of a hardware component of connected hardware.

In the case of the above-mentioned material or immaterial identification means, security can be increased even further in that the means of identification is assigned only once or only temporarily. This is the case, for example, when assigning a one-time PIN or when working with time-limited SSL certificates.

In a development of the method, it is provided that the biometric feature of a human external communication means is a fingerprint, facial contours, the voice, the iris of the eye, the retina of the eye (i.e. ocular fundus), handwriting, for example in the form of a signature, hand geometry, or the palm line structure.

In the preferred implementation of the method for secure communication with a field measuring device, it is further provided that, in the case of an unsuccessful first authentication check and/or second authenticity check, the field device signals the failed attempt and the authenticity checks are repeated only after a predetermined time interval. Preferably, when a predetermined number of consecutive failed attempts is exceeded, any further contact is prevented and authenticity checks are no longer carried out, so that it is impossible to gain access to the field measuring device via the communication interface. Such a lock can then be resolved only by further measures, which are preferably not in connection with the communication interface of the communication unit with the web server.

A development of the aforementioned method is characterized in that the field device only signals to the external communication means that the authenticity check has failed altogether, but not which of the two authenticity checks or whether both authenticity checks have failed. These measures make it impossible for a compromising external means of communication to recognize a potentially correctly-guessed identification means, so that further attacks must always be directed at both authenticity checks.

The above-mentioned object is achieved with the above-described field measuring device of process measurement technology in that upon contact by an external communication means with the web server via the communication interface, a first authenticity check of the external communication means is carried out by the field measuring device and a second authenticity check of the external communication means is carried out, wherein, after successful completion of the first authenticity check and the second authenticity check, further communication of the external communication means with the web server is authorized by the field measuring device.

The authenticity checks are implemented on the technical means of the field measuring device, for example, by appropriate programming of computing units, which are usually part of the field device, and which are usually used for implementing the functionalities of the evaluation unit and the communication unit. Depending on the technical implementation, the evaluation unit and the communication unit can be configured in terms of hardware using separate elements, which is advantageous in particular with regard to security-related issues. The evaluation unit could be implemented, for example, using a hard-wired circuit having operational amplifiers, analog/digital converters, etc., while the communication unit is essentially implemented on the basis of a programmed microcontroller or based on a field programmable gate array (FPGA). The communication interface is possibly implemented using suitable driver components or using a discrete circuit design, provided that the means of the microcontroller used are not sufficient.

In addition to the communication interface, the field measuring device has a fieldbus interface, via which primarily measurement data of the field measuring device are transmitted; this fieldbus interface is therefore essential for the actual functionality of the field measuring device, namely to provide measurement data. This fieldbus interface is, for example, an analog current interface in which measured values are encoded in the current level in the range from 4 mA to 20 mA. Other examples of typical fieldbus protocols are HART or Profibus. There are many other established fieldbus interfaces and protocols. The measured values determined by the field measuring device are usually transmitted exclusively via this fieldbus interface. The method presented here and the field measuring device presented here are particularly advantageous for security-related considerations when the data that can be accessed or transmitted via the communication interface are not measured data. Various measures can be taken within the field measuring device to strictly separate the realm of the data accessible via the fieldbus interface and via the communication interface. However, this is not the subject matter of the present patent application in detail.

The field measuring device according to the invention is preferably designed in such a manner that it implements the previously described method for secure communication in terms of equipment, i.e. the method is implemented in an achievable manner on the field measuring device in terms of device technology. The implementation is carried out in particular using appropriate programming and/or hardware implementation of the evaluation and/or the communication unit.

In a preferred design, the communication interface of the communication unit is designed as a wireless interface, preferably as a wireless interface according to the WLAN standard. This allows access to the field measuring device with devices of consumer electronics, i.e., for example, with mobile phones or tablets. The authenticity checks implemented according to the invention ensure access to the field measuring device despite the use of standard communication interfaces.

In a further design of the field measuring device according to the invention, it is provided that the communication interface of the communication unit is designed as a wired Ethernet interface. The communication unit preferably implements a TCP/IP protocol with the communication interface.

Access to the field measuring device is usually fashioned so that the external communication means contacts the web server implemented on the communication unit of the field measuring device by means of an implemented web browser. This can be done, for example, by entering a specific network address or by having the field measuring device select from a list of all theoretically available communication partners displayed on the external communication means. Upon contact by the external communication means, the corresponding authenticity checks are automatically carried out, for example by displaying an input field for entering an identification feature and/or by requesting the proof of ownership of a material or immaterial identification means. The field measuring device can also retrieve features of the external communication means in the authenticity check, such as, for example, the serial number of the processor installed in the external communication means.

BRIEF DESCRIPTION OF THE DRAWINGS

In detail, there is a plurality of possibilities for further developing the method according to the invention for secure communication with a field measuring device and the corresponding field measuring device. Corresponding developments are the subject matter of the subordinate claims and are described in the following using the shown embodiments.

DETAILED DESCRIPTION

Figure 1:
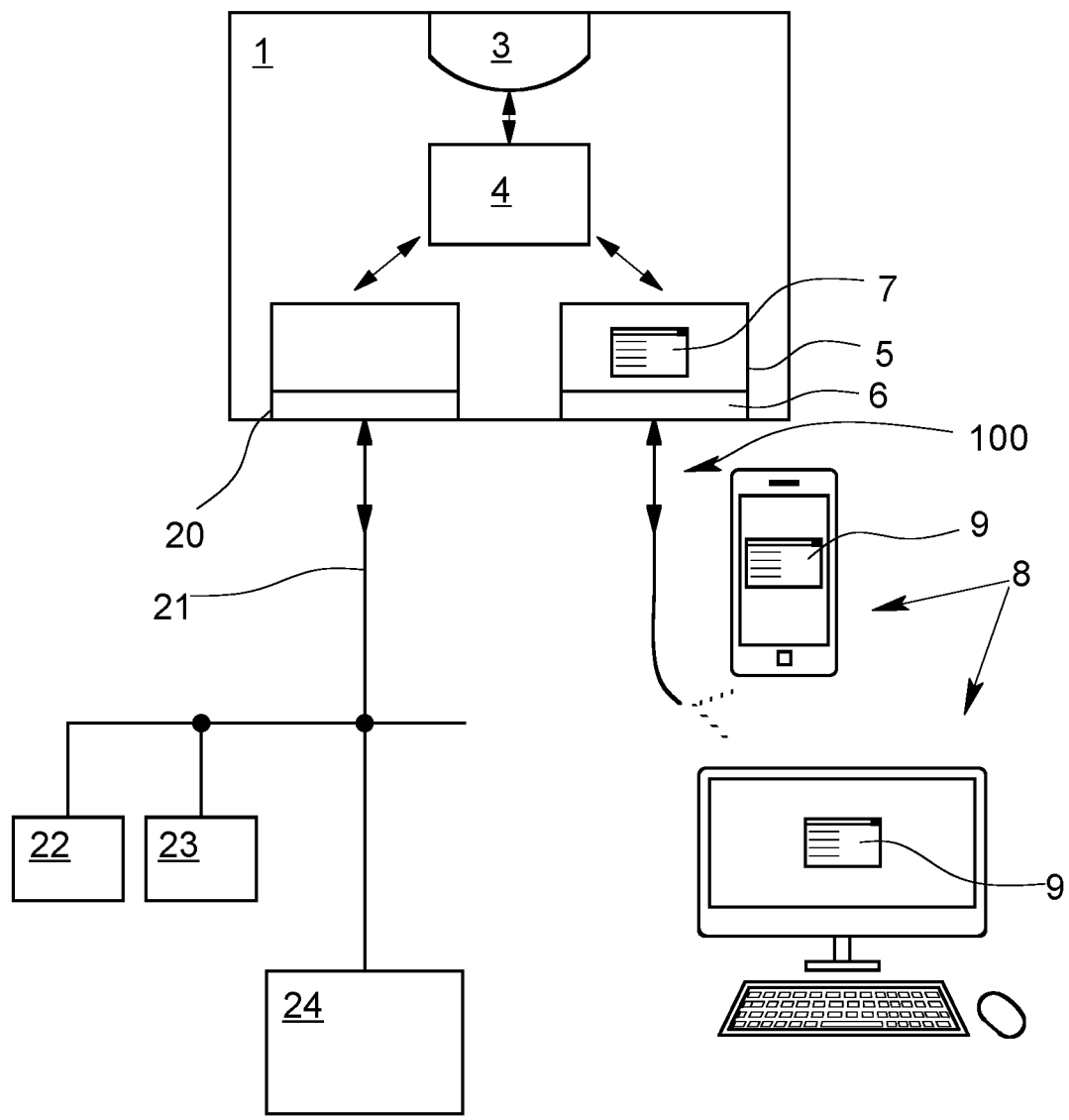
FIG. 1 provides a schematic representation of a field measuring device of process technology in the context of an industrial process as well as, schematically, a method for secure communication with the field measuring device.

FIG. 1 schematically shows a field measuring device 1 of process technology as well as, schematically, a method 2 for secure communication with a field measuring device 1. The field measuring device 1 has a sensor 3, an evaluation unit 4, a fieldbus interface 20 for the transmission of measurement data detected and provided by the field measuring device to other bus devices 22, 23 and/or to a process control system 24 and a communication unit 5 with a communication interface 6. The evaluation unit 4 is used to detect and further process the raw measurement data supplied by the sensor 3.

An external communication means 8 can take up information technology contact with the web server 7 via the communication interface 6. In FIG. 1, a smart phone or a tablet and a workstation computer are shown schematically for the external communication means 8. During contact 100, corresponding information provided by the web server 7 is displayed on the external communication means 8 by means of a web browser 9. The external communication means 8 is thus a client of the web server 7.

Figure 2:
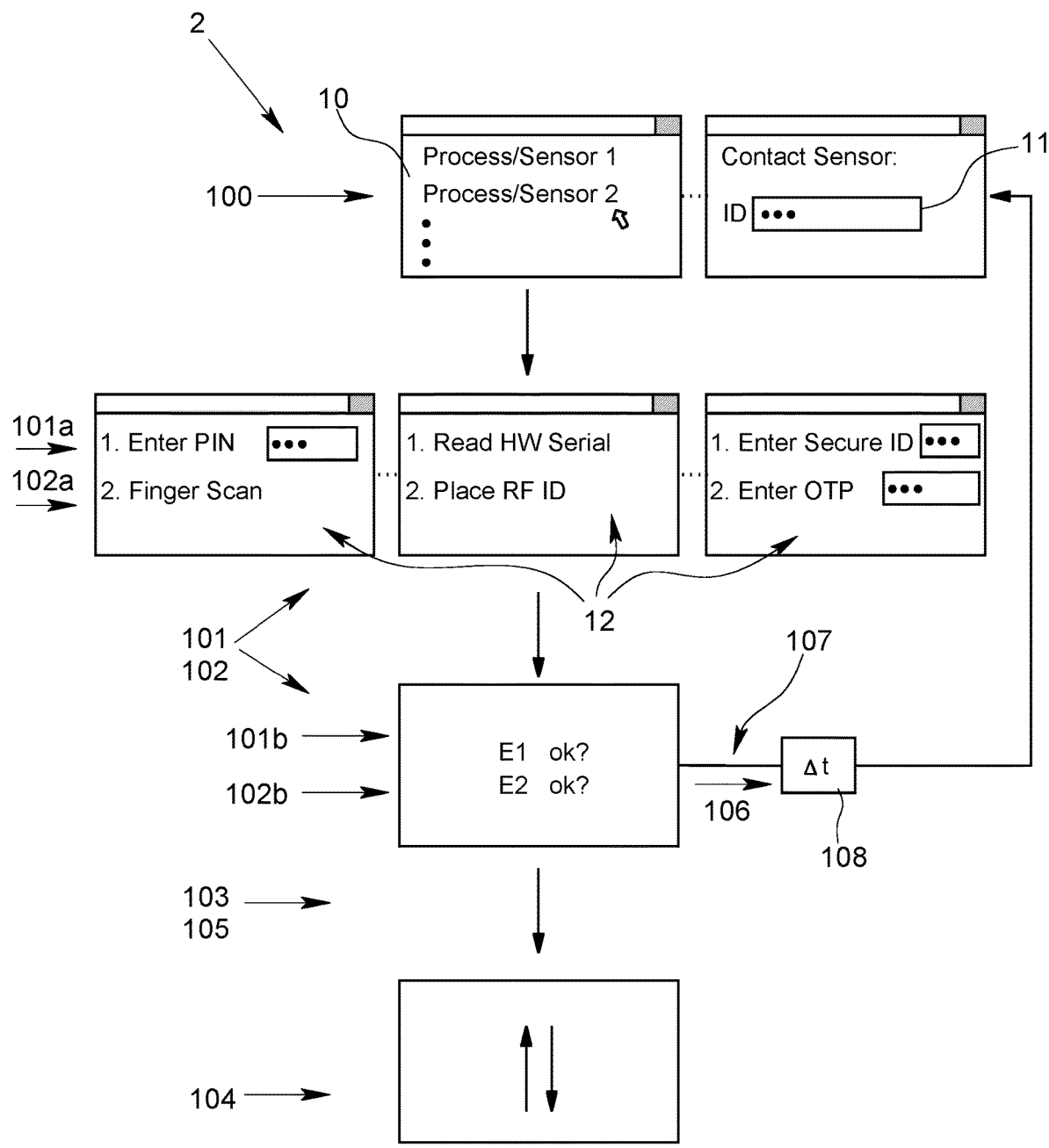
FIG. 2 illustrates several implementations of the method for secure communication with the field measuring device.

FIG. 2 schematically shows the various method steps of the method 2 for secure communication with the field measuring device 1. As part of the contact 100, contact with the field measuring device 1 is made by the external communication means 8. The contact 100 is symbolized here by the selection 10 of different communication partners on a display of the external communication means 8 or by input of an identifier (ID) of the field measuring device 1 to be contacted, indicated by an input field 11.

After the contact 100 has been established, a first authenticity check 101 of the external communication means 8 is carried out by the field measuring device 1, and a second authenticity check 102 of the external communication means 8 is also carried out by the field measuring device 1. The authenticity checks 101, 102 are expressly not CAPTCHA functionalities, which in principle are only suitable for distinguishing between a human and a machine external communication means 8 to a certain extent.

The authenticity checks 101, 102 are shown in two stages in FIG. 2. In the first sub-steps 101a, 102a of the authenticity checks 101, 102, the features 12 to be checked for authenticity are initially detected. In the second sub-steps 101b, 102b of the authenticity checks 101, 102, the actual checking of the now present features 12 then takes place for their authenticity. After successful completion 103 of the first authenticity check 101 and the second authenticity check 102, further communication 104 with the external communication means 8 is authorized 105 by the field measuring device 1.

In the first authenticity check 101 and the second authenticity check 102, features 12 of the external communication means 8 are checked, wherein the features 12 in the given examples can be assigned a total of three identification categories, namely the individual, immaterial identification knowledge of a human first communication means 8, the possession of a material or immaterial identification means, or the biometric features of a human external communication means 8.

In the first sub-steps 101a, 102a of the first authenticity check 101 and the second authenticity check 102, three examples for the query or input of corresponding features 12 are shown. In the example shown on the left, an individual, immaterial identification knowledge in the form of a personal identification number (PIN) is first requested. Furthermore, a biometric feature in the form of a fingerprint is queried. In the second example, which is shown in the middle, a device-specific machine identifier is requested as identification means (Read HW Serial). Thereafter, a feature 12 of the same identification category is requested. The external communication means 8 is requested to place its RFID card on the reader (Place RFID).

In the embodiment shown on the far right in FIG. 2, use is made of the fact that the identification means is assigned only once. First, the external communication means 8 must identify itself by providing a SecureID. Subsequently, the one-time PIN individually generated for this ID must then be entered (Enter OTP).

It is preferably provided that features 12 of different identification categories are checked during the first authenticity check 101 and the second authenticity check 102. This applies to the leftmost example in line 2 of FIG. 2.

If the first authenticity check 101 or the second authenticity check 102 fails, then the field measuring device 1 signals 107 the failure. Only after a predetermined time interval 108 is a repetition of the authenticity checks 101, 102 initiated. The time delay 108 prevents a high repetition frequency of the authenticity check 101, 102, so that mass automated attacks on the communication interface 6 are not possible. Another countermeasure for preventing mass automatic attacks is that the field device 1 only signals 107 to the external communication means 8 that the authenticity checks 101, 102 have failed altogether, but not which of the two authenticity checks 101, 102 or whether both authenticity checks 101, 102 have failed.

In FIG. 1, the common use of a field measuring device 1 is shown, as it has already been discussed at the beginning in the general description. The field measuring device 1 usually has a fieldbus interface 20 in its basic configuration, via which measurement data of the field measuring device 1 are transmitted. The fieldbus interface 20 is the actual process interface. In the present case, the fieldbus interface 20 is an analog current interface to which a digital HART signal is modulated. The field measuring device 1 is connected to further field measuring devices 22, 23 and to a process control system 24 via the field bus 21.

The method 2 described above for secure communication with the field measuring device 1 via the communication interface 6 is implemented in the illustrated field measuring device 1 by appropriate programming of the communication unit 5.

Figure 3A:
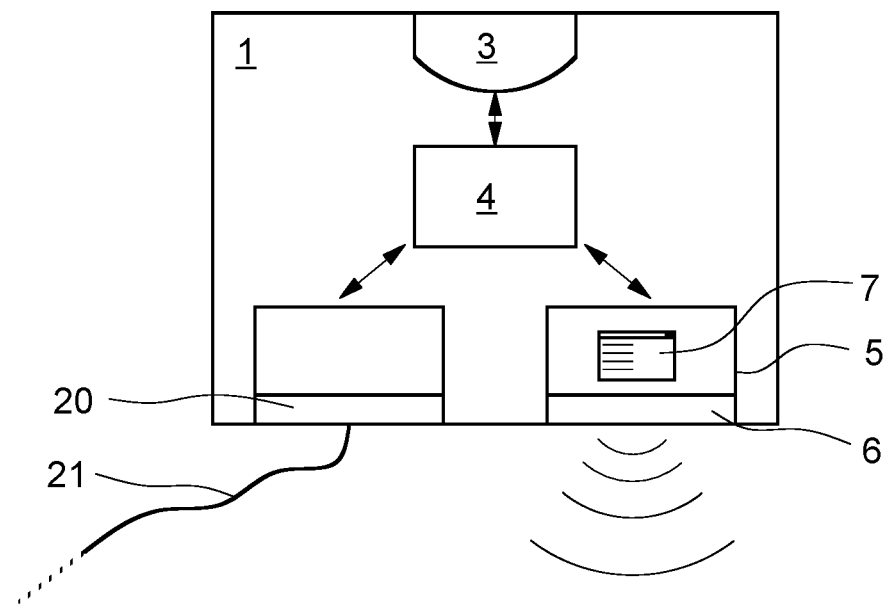
FIGS. 3a and 3b provide two variations of the field measuring device with differently designed communication interfaces.
Figure 3B:
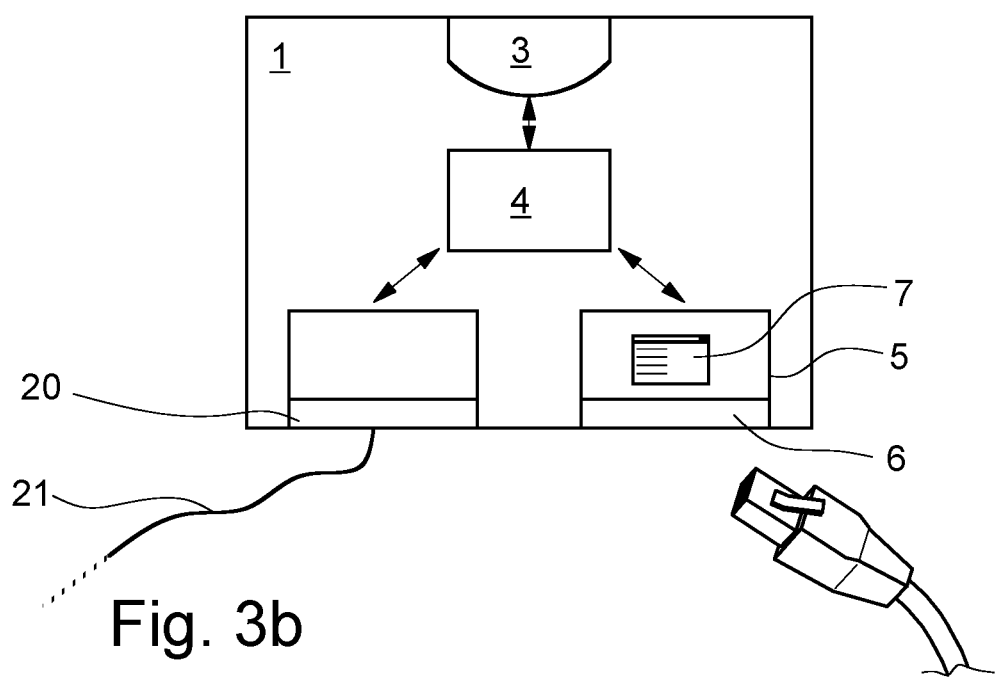

In FIGS. 3a and 3b, two variations of a field measuring device 1 are shown. In FIG. 3a, the communication interface 6 of the communication unit 5 is formed as a wireless interface, here according to the WLAN standard. In the embodiment according to FIG. 3b, the communication interface 6 of the communication unit 5 is designed as a wired Ethernet interface.

The invention claimed is:

1. A method for secure communication with a field measuring device of process technology, wherein the field measuring device comprises a sensor, an evaluation unit, a field bus interface for the transmission of measurement data detected and provided by the sensor of the field measuring device to other bus devices and/or to a process control system via a field bus, and a communication unit with a communication interface, wherein a web server is implemented on the communication unit as an integral component of the field measuring device, wherein the web server is configured to be externally accessed via the communication interface, the method comprising:

upon contact by an external communicator with the web server via the communication interface that does not interface with the field bus, performing a first authenticity check of the external communicator by the field measuring device, and performing a second authenticity check of the external communicator; and after successful completion of the first authenticity check and the second authenticity check, authorizing further communication of the external communicator with the web server by the field measuring device;

wherein the first authenticity check and the second authenticity check each are expressly not a Completely Automated Public Turing Test to Tell Computers and Humans Apart (CAPTCHA) functionality for distinguishing between human and machine external communicators; and wherein the web server is configured to communicate to the external communicator via the communication interface only data that is not the measurement data.

2. The method according to claim 1, wherein a feature of the external communicator of at least one of the following identification categories is checked in the first authenticity check and the second authenticity check: the individual, immaterial identification knowledge of a human external communicator; the possession of a physical or immaterial identifier; a biometric feature of a human external communicator.

3. The method according to claim 2, wherein features of different identification categories are checked in the first authenticity check and the second authenticity check.

4. The method according to claim 2, wherein the individual, immaterial identification knowledge of a human external communicator is a password, a personal identification number (PIN), or the answer to a security question.

5. The method according to claim 2, wherein the physical or immaterial identifier is a chip card in the form of a smart card or a signature card, a magnetic strip card, a radio-frequency identification (RFID) chip, a cryptographic key in the form of a private key or a public key of an asymmetric encryption method, a subscriber identification module (SIM) card, a digital Secure Sockets Layer Certificate (SSL) certificate, a one-time personal identification number (PIN), or a serial number of a hardware component of connected hardware.

6. The method according to claim 2, wherein the material or immaterial identifier is assigned only once or only temporarily.

7. The method according to claim 2, wherein the biometric feature of a human external communicator is a fingerprint, facial contours, the voice, the iris of the eye, the retina of the eye, handwriting, hand geometry or the palm line structure.

8. The method according to claim 1, wherein in the case of a failed first authenticity check and/or second authenticity check, the field measuring device signals the failed attempt and a repetition of the authenticity checks only takes place after a predetermined time interval.

9. The method according to claim 8, wherein the field measuring device only signals to the external communicator that the authenticity checks have failed altogether, but not which of the two authenticity checks have failed or whether both authenticity checks have failed.

10. A field measuring device of process technology, comprising:
   a sensor;
   an evaluation unit;
   a field bus interface for the transmission of measurement data detected and provided by the sensor to other bus devices and/or to a process control system via a field bus; and
   a communication unit having a communication interface and a web server implemented on the communication unit as an integral component of the field measuring device, wherein the communication interface does not interface with the field bus, and wherein the web server is configured to be externally accessed via the communication interface;
   wherein upon contact by an external communicator with the web server via the communication interface, a first authenticity check of the external communicator is carried out by the field measuring device and a second authenticity check of the external communicator is carried out, wherein, after successful completion of the first authenticity check and the second authenticity check, further communication of the external communicator with the web server is authorized by the field measuring device; and
   wherein the first authenticity check and the second authenticity check each are expressly not a Completely Automated Public Turing Test to Tell Computers and Humans Apart (CAPTCHA) functionality for distinguishing between human and machine external communicators; and
   wherein the web server is configured to communicate to the external communicator via the communication interface only data that is not the measurement data.

11. The field measuring device according to claim 10, wherein the field bus interface is an analog current interface, a digital Highway Addressable Remote Transducer (HART) interface or a Profibus interface.

12. The field measuring device according to claim 10, wherein the field measuring device includes device technology to be automatically executable by appropriate programming and/or hardware implementation of the evaluation unit and/or the communication unit to perform a method for securing communication including the following steps:
   upon contact by the external communicator with the web server via the communication interface, performing the first authenticity check of the external communicator by the field measuring device, and performing the second authenticity check of the external communicator; and
   after successful completion of the first authenticity check and the second authenticity check, authorizing further communication of the external communicator with the web server by the field measuring device.

13. The field measuring device according to claim 10, wherein the communication interface of the communication unit is designed as a wireless interface.

14. The field measuring device according to claim 10, wherein the communication interface of the communication unit is designed as a wired Ethernet interface.

15. The method according to claim 1, wherein the external communicator is a client computer.

16. The method according to claim 1, wherein at least one of the first authenticity check and the second authenticity check involves retrieving a feature of the external communicator.

17. A method for secure communication with a field measuring device of process technology, the field measuring device configured to transmit detected measurement data to other bus devices and/or to a process control system via a field bus, the method comprising:
   (i) establishing communication between a web server and a client computer via a communication interface that does not interface with the field bus, wherein the web server is an integral component of the field measuring device and the client computer is disposed external relative to the field measuring device;
   (ii) using the field measuring device to perform a first authenticity check of the client computer, the first authenticity check not involving a Completely Automated Public Turing Test to Tell Computers and Humans Apart (CAPTCHA) functionality;
   (iii) performing a second authenticity check of the client computer, the second authenticity check not involving a CAPTCHA functionality; and
   (iv) after successful completion of the first authenticity check and the second authenticity check, authorizing further communication of the client computer with the web server;
   wherein the web server is configured to communicate to the external communicator only data that is not measurement data detected and provided by a sensor of the field measuring device.

18. The method according to claim 1, wherein the web server is configured to communicate to the external communicator via the communication interface data that is not relevant to a process measured by the field measuring device.

* * * * *